3,353,923
CATALYTIC REACTOR TUBE LINER
Hans Peters, Frankfurt am Main, Germany, assignor to Reichhold Chemicals, Incorporated, White Plains, N.Y.
Filed May 24, 1963, Ser. No. 283,013
Claims priority, application Germany, May 25, 1962, 29,482
3 Claims. (Cl. 23—288)

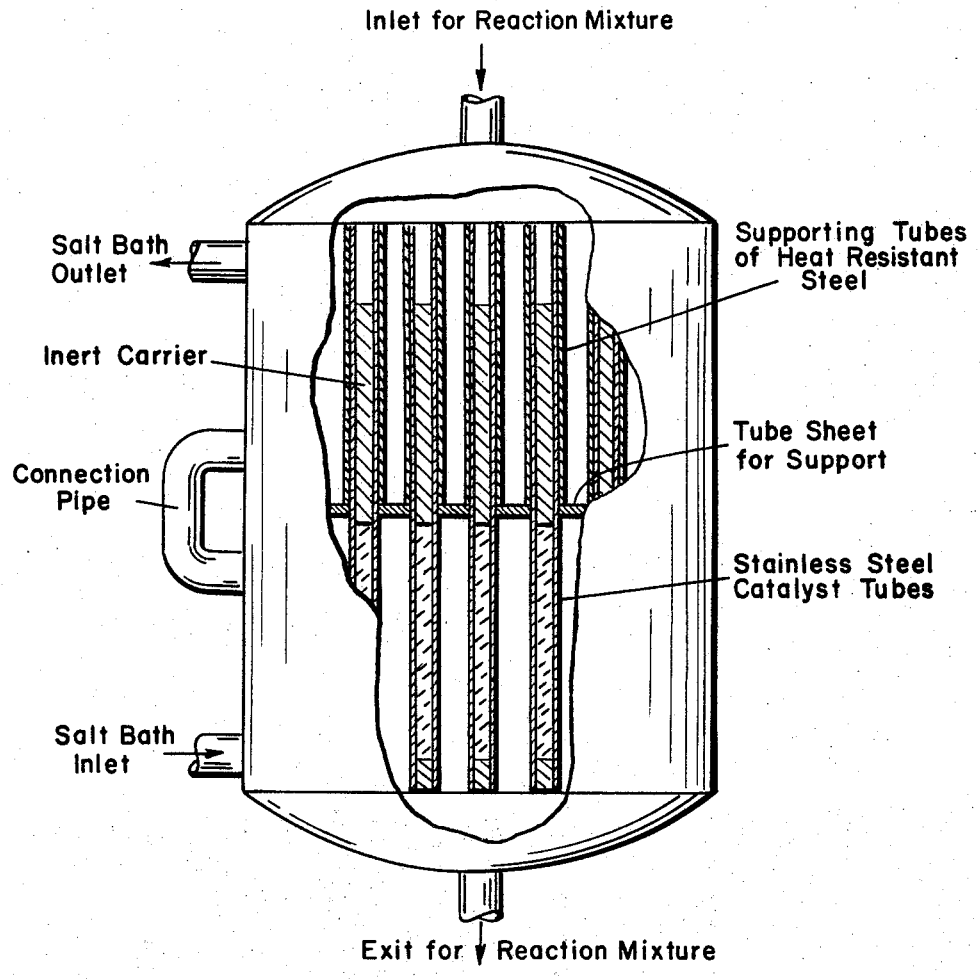

ABSTRACT OF THE DISCLOSURE

The present application discloses an improvement in apparatus for vapor phase catalytic oxidation of aromatic hydrocarbons wherein the hydrocarbon and an oxidizing gas are passed together through heated metal tubing containing the catalyst, the improvement residing in that the tubing is provided with an interior surface comprising a chelate polymer.

---

The invention relates to improvements in apparatus for carrying out vapor phase reaction processes, and more particularly to apparatus for carrying out a process for the production of an organic polybasic acid anhydride such as maleic anhydride or phthalic anhydride, wherein an aromatic hydrocarbon such as benzol naphthalene or o-xylol is passed together with an oxidizing gas such as air or oxygen, through heated reaction tubes containing a granular catalyst such as vanadium pentoxide. The invention will be described with particular reference to the production of phthalic anhydride.

The making of phthalic anhydride from naphthalin (naphthalene) or o-xylol is not a new idea, as the process is generally carried out within a temperature range of 350–460° C. using catalysts containing vanadium oxide. The pipes used to receive the catalysts are technically tempered by fusing salt or with boiling mercury. Phthalic anhydride has gained increasing importance in industry as a raw material for synthetic resins and softeners of plastics and rubbers. This fact readily accounts for the endeavor to obtain a vastly higher yield in the aforementioned conversion of naphthalin (naphthalene) or o-xylol, into phthalic anhydride.

By the conventional methods, the yields amounted to 82–87% of the theory using naphthalene in the conversion, and 60–72% using o-xylol. By varying the reaction temperature, the contact duration and the ratios between the starting substance and the reaction air, these maximum yields can be realized. Considerable research notwithstanding, it has been impossible to exceed these limits, however. The increased demand for phthalic anhydride, however, renders desirable a fuller use of the complex installations, and the attainment of nearly 100° yields.

The reaction tubes generally used with the catalysts are of standard steels, particularly heat-proof steels that will withstand the mechanical strain at the high temperatures.

The discovery has been made that the yield in the conversion of naphthalin into anhydride of phthalic acid can be raised by 5% of theory, and in that of o-xylol even by 10–15% of theory when the reaction pipes containing the catalyst are given an inside lining that is amorphous, as smooth and glass-like as possible and without any pronounced specific crystallite (crystalline) structure, made of a valence-constant material. The astonishing experience was made that when using the conventional pipe of heat-proof steel, as high temperatures are reached, certain negative surface properties within the reaction range, interfere with the complete conversion into anhydride of phthalic acid. This interference is largely due to specific touch-cracking (Berührungskrackung) meaning the conversion of the phthalic acid anhydride molecules on the crystallite structure of iron or iron oxide of the heatproof steel, and partly to catalytic over-oxidation of the reaction mixture on the valence-labile iron oxide.

These surface properties no longer interfere outside of the reaction range, where the temperature is 50–100° C. lower, with the reaction process. The surprising discovery was made that unlike the molecules of the desired end product, the molecules of the starting products naphthalin or o-xylol are not modified by the contact with the wall surface at high temperature. These negative surface properties, however, become particularly troublesome at the high temperature prevailing within the range of maximum reaction (hotspot) on account of the intense molecular activity. Since in converting with o-xylol, the salt bath must have a particularly high temperature (450–470° C.) and the temperature within the range of maximum reaction even attains over 500° C. in parts, this entails a particularly large reduction in the yield of phthalic acid anhydride.

The invention comprises lining the surfaces of the inner walls of pipe made of steel that will mechanically withstand high temperatures, by electroplating or with the flame jet, with such valence-constant metals or metal oxides as do not have specific crystallite structures favoring cracking or conversion of the phthalic acid anhydride molecules by contact. For this purpose, vanadium, tungsten, molybdenum, beryllium, tantalum, titanium, chromium, nickel, aluminum and similar metals may be employed. It is also within the scope of my invention to coat the inner walls of the pipes with catalyst components, such as for instance vanadium pentoxide or a mixture thereof with other catalytically effective metal oxides, this coating being done with the flame jet. Such a coat not only prevents the disintegration of the end product, but the unconverted molecules of the starting substance are converted into the final product in the final range of the pipe. Metals like nickel and cobalt may be applied to the inner pipe surface by wet reduction processes, using, for instance, hydrazine as a component.

Also, certain mixtures of anodic metals may be applied in liquid form, for instance as a suspension, to the pipe wall. Surprisingly, this metal, when dry, is so stable in its valence when in contact with iron, that no oxidation by catalysis of the contacting atoms of the final product will take place.

A particularly suitable material for lining has been found to be ductile aluminum which can be readily applied diluted, layer by layer (aufgeschichtet) on the principle of decomposition of the aluminum alkyls at high temperatures and with the exclusion of air with nitrogen. This process also contemplates improving installations of the conventional kind, with pipes made of steel subject to rusting, and using a salt bath temperature to break down the aluminum alkyls.

Enamelled steel pipes have been found to be particularly immune to the vapors of the reaction mixture, because of the glass-like surface of the enamel coating, which is practically free of any crystal structure and also valence-constant.

Very marked results are obtained by coating the pipe surfaces with "inner-complex" compounds (penetration complexes). Particularly suitable are polymeric chelate compounds, which consist largely of atoms of nitrogen, of carbon and certain metals. The metal would be the iron of the pipe, or of the primary coat. This permits of fixing polyvalent metals at a desirable valence, thus depriving them of their negative surface properties. As chelate polymers, compounds based on organic cyanic compounds (particularly tetracyanethylene) are preferred. They can be applied to the metal surface by a wet process, and also in vapor form. In the latter case, the surface may be preliminarily treated with, say percyanethylene vapors or mixtures thereof with aromatic di or polynitriles at a temperature of 200–300° C.

Although the crystallite structure of stainless steels, like V2A or V4A interferes less with the reaction in the conversion to anhydride of phthalic acid, and the forming of rust is likewise avoided, this material is not preferred on account of its poor mechanical properties at high temperatures, unless additional construction work is done to assure safe operation. It is possible to use VA pipes, whereof the upper parts are housed in stationary (fixierten) pipes of heat-proof steel, whereas the lower parts, containing the catalysts, remain free and unprotected. By this would be achieved an adequate tempering of the initial reaction mixture in the upper part, and at the same time good elimination of the reaction heat in the lower part.

In such an installation, as represented in the fig., the heat-proof pipes could at the lower end, be fixed with, say, a horizontal piece of steel sheet, with guide holes for the pipes. For a more efficient heat exchange, the heat-proof steel pipes may be perforated along their entire length. Another solution is to secure VA sleeves or VA-plated pipes to the inner wall surface of the catalyst pipes made of heat-proof steel.

Since inside coating of pipe walls is often costly and enamel-coating of rather long pipes being technically difficult, the process may be modified in the sense that the coating is limited to the reaction range proper. This range can be selected small at will, if the catalyst area per volume unit of reaction is increased accordingly by the choice of a small grain in the catalyst granulate.

The principles of the process described can also be applied to other processes of oxidation in the vapor phase, such as for instance, the conversion of benzol (benzene) into maleic acid anhydride.

*Example 1*

A 2.8 m. length of pipe, made of heat-proof steel, was coated on its inside with a flame jet, issuing a radial spray, was coated first with molybdenum and then with vanadium pentoxide. A steel pipe of 5 cm. clear diameter, to serve as double wall for receiving the salt bath, was welded at the top and bottom, coaxially, with the surface-treated pipe. Onto a V2A sieve in the bottom of this pipe, a catalyst was poured to a height of 2 m. Through a circulating thermostat (Umwalzthermostat) fused salt at 420° C. was pumped through the tempering space. The naphthalene rate of flow amounted to 80 gr./h., the air-naphthalene ratio was 25:1. In the main reaction zone (hotspot) a temperature of 520° C. was attained. The net yield of anhydride of phthalic acid was higher by 5% of theory than that of a similar installation equipped with catalyst pipe of heat-proof steel.

*Example 2*

A 1.2 m. length of steel pipe of 2.5 cm. clear diameter was coated with an enamel primer and then welded with a 1 m. length of pipe of the same steel and diameter. The resulting 2.2 m. pipe was developed into a catalyst pipe in such manner that the enamelled pipe became the bottom part of the converter. A steel pipe of 5 cm. clear diameter was welded coaxially, to serve as double wall, for receiving the salt bath, to the catalyst pipe at the top and bottom. Onto a V2A sieve in the bottom of the converter pipe, an inert aluminum oxide carrier was first poured to a height of 10 cm. On top of this, the catalyst for the o-xylol conversion was poured 1 m. high. It thus only came in contact with enamelled surfaces, but no iron. Due to the small grain of the catalyst, which was only 3 mm., a sufficiently large contact area was assured over the short distance. On top of the catalyst, more of the inert carrier was added, 60 cm. deep. During the oxidation process, the temperature of the salt bath was 460° C., and the maximum temperature (hotspot) was 590° C. The rate of flow amounted to 90 g. of o-xylol/h., and the air:xylol ratio was 27:1. The net yield of phthalic acid anhydride exceeded theory by 15% over the yield of a comparable installation with catalyst pipe made of unprotected, heat-proof steel.

I claim:

1. In an apparatus for vapor phase catalytic oxidation of an aromatic hydrocarbon to produce an organic polybasic acid anhydride, wherein the hydrocarbon and an oxidizing gas are passed together through heated metal tubes containing the catalyst; the improvement wherein the tubing is provided with an interior surface comprising a chelate polymer.

2. An apparatus as defined in claim 1 wherein the tubing is of ferrous metal having an interior surface of a chelate polymer.

3. An apparatus as defined in claim 1 wherein the chelate polymer is an organic cyanic compound.

References Cited

UNITED STATES PATENTS

| | | | |
|---|---|---|---|
| 1,854,882 | 4/1932 | Calcott et al. | 260—346.4 |
| 1,872,956 | 8/1932 | Jaeger et al. | 260—346.4 X |
| 2,863,879 | 12/1958 | Tribet | 260—346.4 |

JAMES H. TAYMAN, JR., *Primary Examiner.*

MORRIS O. WOLK, *Examiner.*